March 19, 1940.　　　M. H. GRAHAM　　　2,194,118
FOOD PROCESSING VESSEL
Filed Oct. 15, 1938　　　2 Sheets-Sheet 1

INVENTOR
MAURICE H. GRAHAM
By Paul, Paul, Moore & Giese
ATTORNEYS

March 19, 1940. M. H. GRAHAM 2,194,118
FOOD PROCESSING VESSEL
Filed Oct. 15, 1938 2 Sheets-Sheet 2
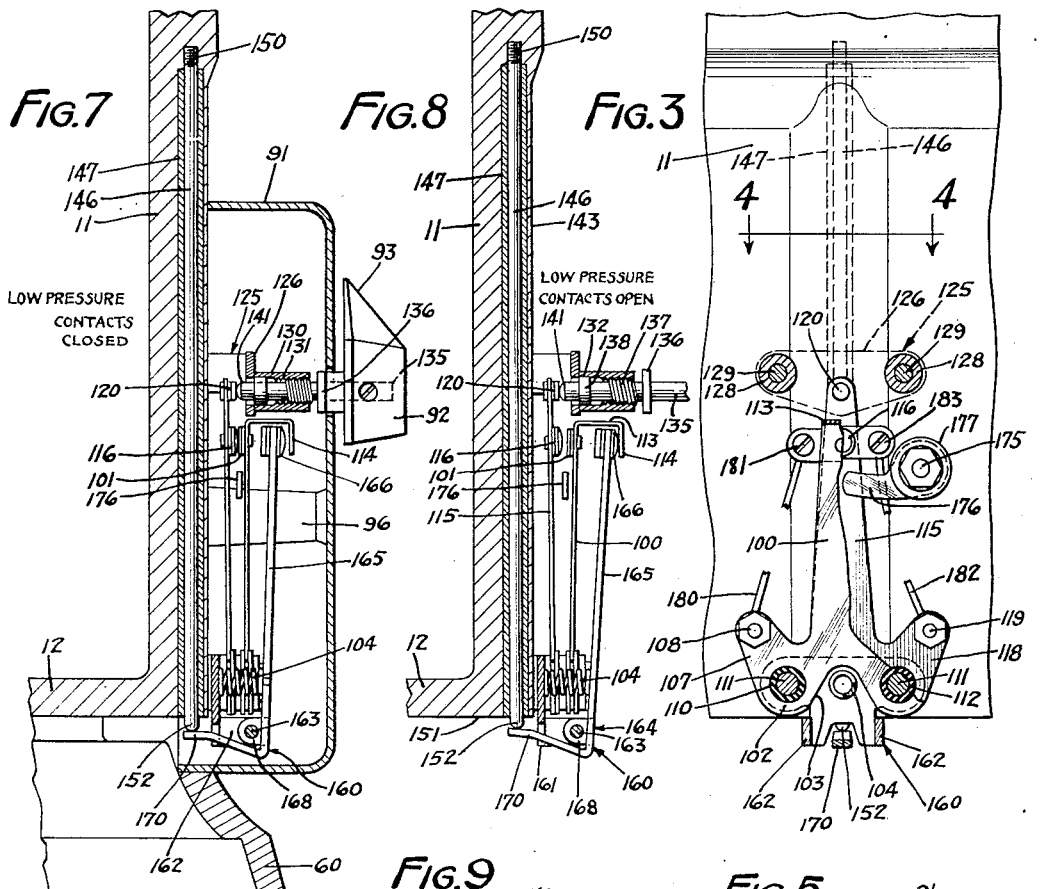
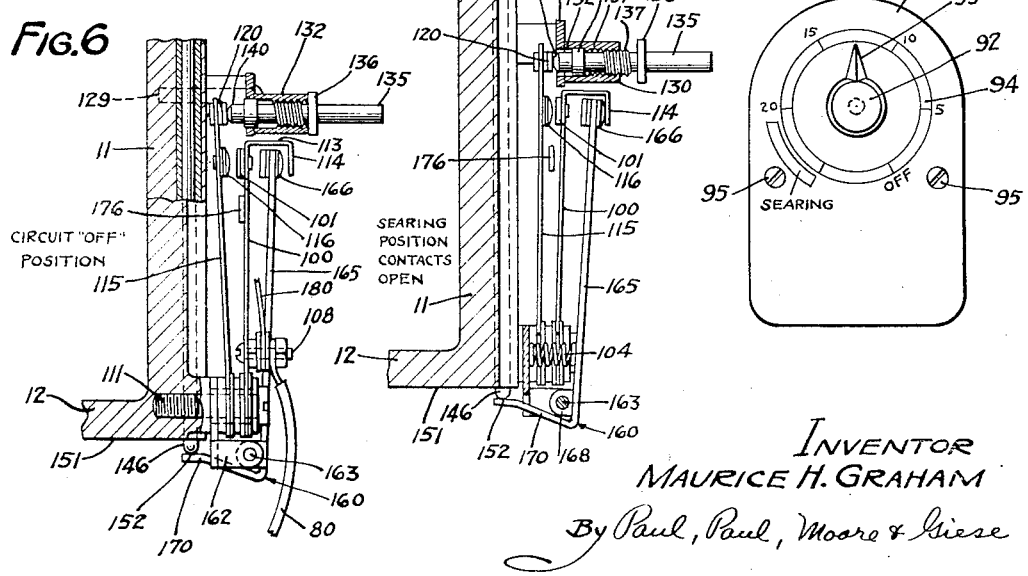
INVENTOR
MAURICE H. GRAHAM
By Paul, Paul, Moore & Giese
ATTORNEYS Patented Mar. 19, 1940

2,194,118

UNITED STATES PATENT OFFICE 2,194,118

FOOD PROCESSING VESSEL

Maurice H. Graham, Minneapolis, Minn.

Application October 15, 1938, Serial No. 235,237

10 Claims. (Cl. 219—44)

The present invention relates to food processing vessels of the type in which food may be treated at elevated pressures and temperatures by steam which is generated by the application of heat to the vessel, or under atmospheric pressure at searing temperatures, and particularly to electrically heated processing vessels in which the application of heat to the vessel is automatically controlled thermostatically whereby the operating pressure or temperature is maintained at any desired value.

I have discovered that in pressure cooker vessels, the temperature within the vessel varies in accordance with the pressure provided air is carefully exhausted from the vessel, and that when the vessel is constructed of good heat conducting material such as aluminum, copper or alloys of these metals, the pressure also corresponds very closely to the operating temperature of the vessel wall.

I have discovered that when the vessel is made of a material having a relatively large coefficient of expansion with heat that the expansion and contraction of the vessel may be utilized to control the application of heat to the vessel and accordingly the pressure within the vessel when the latter is used as a pressure cooker. The pressure may be controlled with exceptional accuracy in this manner. By utilizing the same function searing temperatures of the vessel may likewise be controlled relatively accurately when it is used as a searing device.

It is therefore an object of the present invention to provide a new method of controlling the application of heat to a pressure cooking vessel, and a new and improved method of carrying out this method.

It is also an object to provide a new pressure cooking apparatus in which the expansion of the vessel itself is used to control the application of heat to and pressure developed in the vessel.

It is a further object of the invention to provide a new and improved pressure cooking apparatus in which the expansion of the metal in the pressure cooker due to the pressure and/or temperature of the vessel is used to regulate the application of heat to the vessel.

Specifically, it is an object of the invention to provide a pressure cooking vessel which is constructed of a metal having relatively large thermal coefficient of expansion and to provide an insert or coextensive segment of metal having a relatively small thermal coefficient of expansion, whereby the vessel and segment expand differentially with variation in temperature and thereby control the pressure and temperature of the vessel.

Other and further objects of the invention are those inherent in and implied by the inventions herein illustrated, described and claimed.

The invention is described with reference to the drawings in which like characters designate corresponding parts in all views, and in which Figure 1 is a front elevation of the assembled vessel with certain upper portions shown in section and with the cover of the control device removed so as to show the control mechanism of the vessel.

Figure 3 is an enlarged fragmentary front view of the control mechanism partly in section and with some elements broken away.

Figure 5 is a front elevational view of the control cover mechanism.

Figure 6 is a partial sectional view along the line 6—6 of Figure 1 showing the control mechanism adjusted to the "Off" position.

Figure 1:
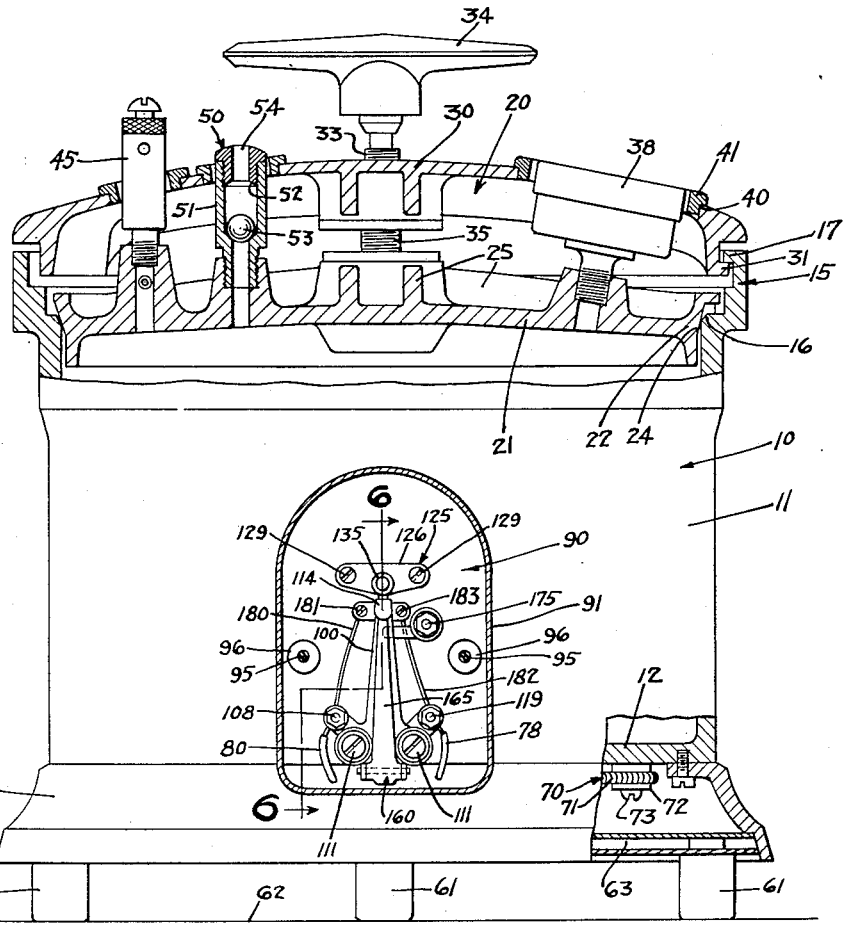
Figure 2:
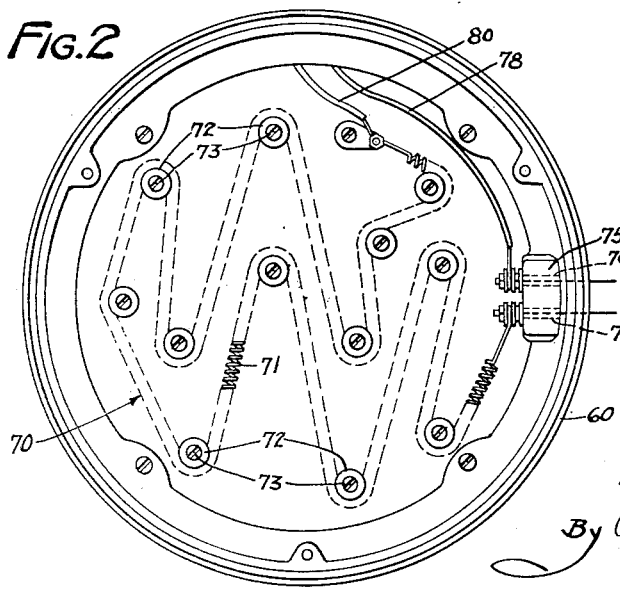
Figure 2 is a bottom view of the vessel, with the bottom cover plate removed, showing the heating element and wiring connection.

Figure 7 generally corresponds to Figure 6 except that certain portions of the control mechanism and cover are shown in section and that the control mechanism is shown adjusted to a low pressure condition and the contacts are shown closed.

Figure 8 corresponds to Figure 7 except that the contacts of the control mechanism are shown in the open position.

Figure 9 corresponds generally to Figures 6, 7 and 8 except that the control mechanism is shown adjusted to the searing temperature condition.

According to the present invention the pressure of a pressure cooking vessel, or the temperature of a combined pressure cooker and baking vessel may be maintained at any predetermined value by utilizing the expansion function of the vessel itself for the control or regulation of the heat input to the vessel. The method may be carried out manually by utilizing precision measurements for determining expansion of the vessel during operating conditions. When the vessel has expanded sufficiently the heat input thereto is reduced or entirely terminated, whereupon the vessel will either be maintained in its expanded condition or will begin to contract if the heat input is reduced below that necessary to sustain heat losses and absorption. When the vessel contracts a predetermined amount the heat input is again increased or re-initiated. Thus by periodically varying the input to the vessel or by reducing the input to a predetermined amount as determined by the expansion of the vessel, the pressure of the pressure cooker, or temperature of the vessel if it is used for searing or baking at atmospheric temperatures, may be maintained at any predetermined amount.

While the method of the present invention may thus be carried out manually in accordance with the thermal expansion function of the vessel I prefer to carry out the method automatically by a device such as that illustrated in the drawings.

In Figure 1 there is illustrated a pressure cooker generally designated 10, which is preferably made of cast aluminum or other strong metal having a high coefficient of heat transmission and a high coefficient of expansion with heat. The vessel consists of side wall portion 11 and a bottom portion 12 which are preferably formed integrally as by casting. The vessel may be provided with a cover of any approved construction.

As shown in Figure 1, the upper edge of the wall 11 is provided with a locking rim arrangement generally designated 15, with which the cover structure generally designated 20 cooperates. The rim 15 has a pressure seal edge 16 and a bayonet fastening rim 17.

The cover generally designated 20 includes an inner cover 21 having a flanged rim 22. The flange 22 includes a conical surface 24 which seats on the pressure seal edge 16 of the container 10.

The inner cover is provided with adequate cross-bracing webs 25 which serve not only to stiffen the cover but also to carry the forces produced by the locking mechanism of the outer cover 30. The latter is provided with a plurality of bayonet teeth 31 which cooperate with bayonet locking flange 17 of the vessel. A hand screw 33 is threaded into the cover and is arranged to be rotated by a removable handle 34. The lower end 35 of the screw bears against the inner cover 25 and forces the latter into tight engagement with the vessel 10.

The inner cover 21 is provided with a pressure-temperature gauge 38 which projects through the opening 40 of the outer cover. The opening is preferably ornamented by rim 41 of molded resinous material or bright metal. The cover is also provided with a combined manual and over-pressure release valve 45 and with an automatic air-vent valve generally designated 50. Both of these project through openings in the outer cover. These openings may likewise be ornamented by rims of molded resinous material or bright metal.

The automatic air-vent generally designated 50 consists of a barrel 51 which has a valve seat 52 formed at its upper end. Within the barrel there is positioned a ball 53 of steel, the diameter of which is slightly less than barrel 51. When relatively dry air is forced from the vessel through vent 54 the air passes between the ball 53 and the barrel 51 without appreciably raising the ball. However, when steam strikes the ball it is raised due to the sealing effect of the condensed moisture and the ball 53 is therefore raised by the up-rush of steam until it strikes against the valve seat portion 52 where it is retained in place by the pressure of the steam. No further steam is then permitted to pass through vent 54. The automatic air-vent 50 thus provides for exhausting the air from the cooking vessel upon initial heating and for sealing the vessel when a substantial amount of steam begins to escape. Other automatic air-vents, such as a thermostatically controlled air-vent may be substituted for the ball check valve vent herein illustrated.

The cooking vessel is supported upon a rim 60 which is preferably a casting which is enameled or otherwise decorated. Rim 60 is provided with feet 61 which support it a sufficient distance from surface 62 so that the surface will not be damaged by heat when the vessel is operating. The base cover 63 is provided within the rim and serves to protect the heating element 70 which is positioned in the space between the bottom 12 of the cooking vessel and cover 63.

The heating element 70 in the present instance consists of a coil 71 of heat resistant alloy which is supported upon a plurality of porcelain knobs 72. The latter are in turn fastened to the bottom 12 by means of screws 73. At one side of the base 60 there is formed a recess 75 which is provided with terminals 76 and 77. Terminal 77 is connected directly to the heating element and terminal 76 is connected by wire 78 to the switching apparatus hereinafter to be described. Wire 80 from the other end of the heating element also connects with the switching apparatus as described below.

Any other heating element may be substituted for that specifically illustrated herein. Thus an enclosed heating element may be substituted for the open coil element herein illustrated, or a flat type heating element similar to those used in electric flatirons may be used.

The automatic control apparatus generally designated 90 which serves to control and regulate the heat input to the container 11 is housed at the side of the vessel and is normally covered by a bright metal stamping 91 which serves completely to enclose the control apparatus. An operating knob 92 is positioned on the front face of cover 91 and has a pointer 93 which cooperates with scale 94 on which appropriate markings of the "Off" position, the pressure range of the pressure cooking vessel and the searing position are shown. The cover 91 is normally held in place by screws 95—95 which extend through the cover into bosses 96 cast on the vessel wall.

Referring now to Figures 1, 3 and 6 particularly, it will be seen that the control mechanism 90 consists of a pair of switch arms 100 and 115 which carry contacts 101 and 116, respectively of the electric circuit. Switch arm 100 has a lower cross-piece 102 which is cut out at 103 to accommodate spring 104. The lower cross-piece has an extension 107 which carries contact stud 108. The cross-piece portion 102 is apertured at 110 to receive mounting screws 111 which are insulated by insulating sleeves 112. The upper end of switch arm 100 is bent over at 113, as shown in Figure 6, and downwardly at 114.

Switch arm 115 at the bottom is shaped similar to switch arm 100 except that ear 118 extends to the right and carries stud 119. At the upper end switch arm 115 is straight and is provided with a button 120 which is insulated from switch arm 115.

Adjacent insulated button 120 there is a bracket generally designated 125 which consists of a cross plate shown by the dotted lines 126 of Figure 3. This cross plate is mounted in fixed position by means of screws 129 and spacing collars 128.

Upon the outer surface of cross-piece 126 there is mounted a sleeve 130 which is internally threaded throughout a portion of its length as shown at 131 and is bored to the depth of the threads throughout another portion of its length as shown at 132. Sleeve 130 serves to support an adjusting shaft 135 which has a flange 136 and screw threads 137 formed as shown in Figures 6 through 9. The shaft 135 is also provided with a collar 138 of a diameter such that it neatly fits into the bored portion 132. The collar 138 is spaced so as to limit the movement of the shaft 135 to the right (counterclockwise rotation) to the position shown in Figure 9, in which the adjustment tip 140 of the shaft just clears the inner surface of cross-piece 126. It is noted that adjustment tip 140 always bears against the insulated button 120 and that contact strip 115 is tensioned so as normally to move to the right and thus continuously bears against the adjustment tip 140. The movement of adjustment shaft 135 to the left (clockwise rotation) as shown in Figures 6 through 9 is limited by flange 136.

Figure 4:
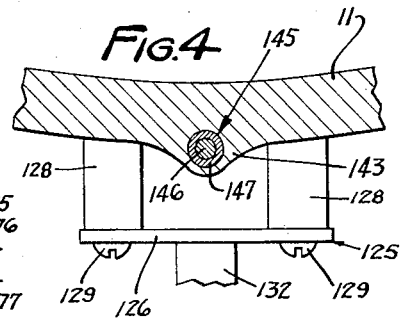
Figure 4 is an enlarged fragmentary sectional view along the line 4—4 of Figure 3.

The vessel wall is formed with a bulge 143 as shown in Figure 4 in which a unit generally designated 145 is positioned. The unit 145 consists of a rod 146 which is preferably composed of an alloy having a very low coefficient of expansion with heat, such as an alloy composed of 42 per cent nickel and 58 per cent iron which has a coefficient of expansion with heat which is about one-fourth as large as that of aluminum. The rod 146 is preferably housed in an aluminum tube 147 which fits the rod 146 snugly but not so tightly as to bind it against movement relative to the tube. The tube 147 is itself cast into the metal wall 11 during the manufacture of the wall. If desired the nickel-iron rod and tube as a unit may be cast into the wall 11 during manufacture or only the tube 147 may be cast in, and the nickel-iron rod inserted after the casting operation has been completed. The upper end of the nickel-iron rod is threaded into the vessel wall as shown at 150 or may merely be burred or scored so that the aluminum or aluminum alloy of the vessel wall 11 becomes tightly attached to it at 150.

The aluminum tube 147 extends to the lower surface 151 of bottom 12, as shown in Figures 6 through 9, whereas the nickel-iron rod extends somewhat below surface 151.

When the vessel is cool the nickel-iron rod 146 extends below the surface 151 to a maximum degree, as shown in Figure 6 but as the vessel is heated the vessel wall expands to a greater extent than the nickel-iron rod and as a consequence the latter is drawn upwardly to a position such as that shown in Figures 8 or 9. As the vessel wall again cools the nickel-iron rod begins to protrude farther and farther from the vessel below the surface 151. This movement of the lower tip 152 is utilized to actuate contact strip 100 with reference to contact strip 115.

The actuation of contact strip 100 from rod 146 is carried out by means of motion multiplying mechanism generally designated 160. The motion multiplying mechanism may consist of any desired mechanical movement capable of multiplying a very small motion into a relatively large motion but preferably consists of a simple lever having long and short arms as herein illustrated. The multiplying mechanism 160 consists of a bracket 161 which is mounted upon screws 111. The bracket extends downwardly as shown in Figures 1 and 6 through 9 and has outwardly extending pivot arms 162 which carry a pivot shaft 163. The multiplying lever 164 has a long arm 165 which is provided with insulated button 166 at its upper end. The arm 165 is of such a length that button 166 reposes between the upwardly extending portion of contact arm 100 and the bent-over end 114, as clearly shown in Figures 6 through 9. Spring 104 reposes in the space between bracket 161 and arm 165, and normally forces the arm to the right, as shown in Figures 6-9.

Lever 164 is provided with inwardly bent ears 168 through which pivot shaft 163 passes. The shaft serves to support the multiplying lever and forms a fulcrum. The short arm of the lever is shown at 170 and extends backwardly as shown in Figure 1, or to the left as shown in Figures 6 through 9, to a position in contact with the lower tip 152 of rod 146. Thus as the kettle is heated and rod 146 contracts into the sidewall, short arm 170 is raised and long arm 165 of the multiplying lever arrangement moves to the right and consequently moves switch arm 100 with reference to switch arm 115. Contact 101 is separate from contact 116 at a position determined by the position of contact arm 115 and the position of the latter is in turn determined by adjusting shaft 135.

To the right of the contact arms, as shown in Figures 1 and 3 there is provided a stud 175 upon which there is mounted a stop arm 176 which is insulated from the stud by means of mica washers 177. The arm 176 serves to limit the movement of movable contact arm 100 to the left, as shown in Figure 6.

It will be noted in Figures 1 and 3 that a pigtail connection 180 is provided from stud 108 to the contact connection 181 of contact 100, and that a pigtail 182 is provided from contact stud 119 to contact connection 183 of contact 116 on arm 115.

*Operation*

By reference to Figures 1 through 6 it will be noted that adjustment shaft 135 may be rotated a total of about two revolutions in order to move it from the position shown in Figure 6 to the position shown in Figure 9. When the shaft 135 is rotated to the right, to a position in which flange 136 is against sleeve 132 as shown in Figure 6, the adjustment tip 140 will be extended and contact arm 115 moved to a position such as to open circuit contact 116 from contact 101. The spring tension in contact arm 100 normally urges the arm to the left as shown in Figure 6 but movement is limited by stop 176. Contact 101 is thus maintained separated from contact 116 and no current is supplied to heating element 70. In this condition the pointer 93 of knob 92 is adjacent the "Off" designation of scale 94.

In order to operate the vessel the cover generally designated 20 is fitted into place and the handle 34 turned to the right so as to force inner cover 21 into pressure-tight engagement with the vessel wall 11. The knob 92 is then rotated counterclockwise to a position in the pressure range, such as that illustrated in Figure 7. In this position the shaft 135 will have been moved to the right a distance sufficient to bring contact 116 into engagement with contact 101 and current thus flows from terminal 76 through wire 78 to stud 119, thence through pigtail 182, contact connection 183, contact 116, contact 101, contact connection 181, pigtail 180, stud 108, wire 80 through the heating element 70 to terminal 77 and heat will accordingly be liberated at the heating element and applied to the base of the pressure cooker. Heat will be conducted with the vessel and as the vessel is brought up to the boiling temperature steam will be generated from the moisture present in the foods being processed or due to water being added to the kettle. During the heating period air within the vessel will be expanded and will be forced out through the automatic air-vent 50, as described above, but as steam is exhausted the ball 53 will be raised and the escape of steam prevented. The pressure of the vessel then rises and as the pressure rises the temperature of wall 11 will also rise to a corresponding degree. When the vessel is operated as a pressure cooker the maximum temperature variation from the steam on the interior of the vessel to the coldest part of the vessel will be but a few degrees and as a consequence the temperature function of the vessel wall 11 for all practical purposes corresponds exactly to the pressure function of the pressure generated within the vessel.

As the temperature of the vessel wall 11 rises, corresponding to the increase of pressure within the vessel, the wall will be expanded. The nickel-iron rod 146, however, will expand to a very much less degree than the metal of the wall. The vessel is usually of aluminum or one of its alloys. The ratio of the coefficient of expansion of an alloy of nickel 42% and iron 58% to the coefficient of expansion of aluminum, over the temperature ranges encountered in the operation of a pressure cooker and searing vessel, is about 1 to 4. After the pressure-temperature has increased to a predetermined degree the nickel-iron rod 146 will assume the position shown in Figure 8 and tip 152 will be drawn upwardly with reference to lower surface 151 of the vessel. Spring 104 which bears against the long arm 165 of multiplying lever 160 maintains the short arm 170 of the multiplying lever uniformly in contact with the lower tip 152 of rod 146 and therefore, as the rod is drawn upwardly, long arm 165 of the multiplying lever moves clockwise until insulated contact button 166 is moved into engagement with the overhanging tip 114 of contact arm 100, and contact arm 100 will accordingly be moved to the right as shown in Figure 8 away from contact arm 115. As a consequence contact 105 is separated from contact 116 and the power supply to heating element 70 is interrupted.

Upon interruption of the power supply to heating element 70 the vessel, the pressure and temperature therein decrease, due to the absorption of heat by the foods being processed and due to radiation from the vessel. As the pressure-temperature drops the nickel-iron rod 146 will gradually extend downwardly from surface 151 and multiplying lever 160 will be rotated counter-clockwise and as a consequence will permit contact arm 100 to move toward contact arm 115. When the contact arm 100 has moved a sufficient distance to the left as shown in Figure 8, the circuit will be re-established and heat again applied to the vessel. The periodic application of heat to the vessel in this way is continued indefinitely until the adjustment shaft 135 is again rotated to the open circuit position shown in Figure 6 or until the seating is changed to a higher or lower pressure position. During this time the pressure-temperature is maintained practically constant, only a few degrees change being needed to cause application or interruption of the power supply.

When it is desired to use the vessel for searing the cover 20 is loosely placed upon the vessel so as not to be in pressure-tight relation and the knob 92 is rotated more than one turn counter-clockwise from the "Off" position until the pointer 93 is opposite the searing range of the scale. In this position the tip 140 of adjusting shaft 135 will be drawn to the right, as shown in Figure 9 and contacts 101 and 116 brought into engagement. Heating of the vessel will accordingly ensue as described above and will continue until the nickel-iron rod 146 has been drawn upwardly a distance sufficient to operate multiplying lever mechanism 160 to withdraw contact 101 from contact 116, all as previously described. However, due to the setting of adjustment shaft 135 a considerably higher temperature will be attained before the contacts are opened than when the setting is as shown in Figures 7 and 8.

Power will be supplied intermittently to the heating element and the vessel maintained at searing temperatures until the adjustment shaft 135 is again rotated in a clockwise direction as far as it can be turned, at which time the contacts will again be moved to the position shown in Figure 6 and the power supply to the heating element interrupted.

The temperature of the wall is in this instance determined by heat conduction through the wall itself rather than by steam within the vessel as is the case when the vessel is operating as a pressure cooker. As a consequence the temperature differential from the hottest spot to the coldest spot on the vessel will be greater than is the case in pressure cooker operation. However, the heat conduction of the material of the wall, and thickness of the wall are such as to facilitate heat flow to all parts of the vessel.

It is thus apparent that I have provided a food processing vessel which may be used as a pressure cooker or as a searing vessel and in which the pressure-temperature of the vessel when it is used as a pressure cooker, or the temperature of the vessel when it is used as a baking or searing vessel, may be maintained at any predetermined degree by a heat control which is responsive to the expansion of the vessel under operating conditions.

It is obvious that many variations may be made in the apparatus and method herein described and illustrated. Thus, if desired, the aluminum tube 147 may be eliminated and the bore for the nickel iron-rod provided by drilling, or by machining a slot in the side of the vessel. It is not strictly essential that the nickel-iron rod be in close thermal communication with the side wall of the vessel since it merely establishes a datum condition by which the expansion of the vessel is measured and determined. Thus, if desired, the nickel-iron rod or other rod of relatively inexpensive material may be mounted in a housing on the outside of the vessel. In such a housing the temperature would rise to a degree determined by the size, shape and configuration of the housing but the temperature condition within the housing would be repeated and the expansion function of the rod 146 would accordingly serve as a datum even as the rod in the present drawings serves as the datum condition. Similarly, if desired, a nickel-iron strip may be used to encircle the vessel and a circumferential expansion used to determine the application or variation of heat to the vessel. Furthermore, if desired, instead of completely interrupting the heating supply to the vessel it may merely be reduced. These and many other modifications will occur to those skilled in the art and are deemed to come within the scope of the invention herein described and claimed.

I claim as my invention:

1. A pressure cooker vessel for the processing of foods at elevated temperatures and at elevated pressures by heat applied to the outside of the vessel comprising a pressure tight envelope having a wall of heat conducting material, an electrical heating element for heating the vessel mounted adjacent the base of the vessel, an electrical circuit for said heating element, including a switch and thermostatic means on an outside wall of said vessel for operating said switch, said means including a differential expansion unit composed of a section of said vessel wall and a part of dissimilar material having a coefficient of expansion different than that of the material in the vessel wall.

2. A pressure cooker vessel for the processing of foods at elevated temperatures and at elevated pressures by heat applied to the outside of the vessel comprising, a pressure tight metal container of heat conducting material for the food being processed, an electrical heating element mounted on the bottom of said container, a circuit for said heating element, including a switch, and thermostatic means for actuating said switch, including a differential expansion unit composed of a portion of the heat conducting metal wall and a part of dissimilar material mounted adjacent thereto.

3. A pressure cooker vessel for the processing of foods at elevated temperatures and at elevated pressures by heat applied to the outside of the vessel, comprising a pressure-tight container of heat conducting metal for the food being processed, an electrical heating element mounted adjacent one part of said container, a circuit for said heating element including a switch, and thermostatic means for actuating said switch, including a bar of metal different than the metal of the container, mounted on another part of said container remote from said heating element.

4. A pressure cooker vessel for the processing of foods at elevated temperatures and at elevated pressures by heat applied to the outside of the vessel comprising, a pressure tight metal container of heat conducting metal for the food being processed, an electrical heating element mounted adjacent one part of said container, a circuit for said heating element including a switch, and thermostatic means including a bar of metal imbedded in a portion of the wall of said container remote from said heating element, said bar being attached at one end to the metal of said container and being free to move with reference to the container throughout the remainder of its length, and a multiplying lever actuated by said bar for actuating said switch.

5. A pressure cooker vessel for processing food at elevated temperatures and pressures or at elevated temperatures comprising a container of heat conducting metal, a pressure-tight lid for said container, an electrical heating unit mounted on the bottom of said container for heating the same, means including an electric switch having a movable element for energizing and de-energizing said heating element, and thermostatic means for operating said switch, including a length of metal having a very small coefficient of expansion with heat, mounted substantially parallel with a segment of said container wall remote from the heating element, said length of metal being attached at one end to said container and having the remainder of its length free to move with reference to the vessel, and a connection between the free end of the length of metal and the movable element of the switch for operating said switch when the container is heated.

6. A pressure cooker vessel for processing food at elevated temperatures and pressures or at elevated temperatures comprising a container of heat conducting metal, a pressure-tight lid for said container, an electrical heating unit mounted adjacent the bottom of said container for heating the same, means including an electric switch having an adjustable element, a movable element for energizing and de-energizing said heating element, a thermostatic means for operating said switch, including a length of metal having a very small coefficient of expansion with heat, mounted substantially parallel with a segment of said container wall remote from said heating unit, said length of metal being attached at one end to said container and having the remainder of its length free to move with reference to the vessel, and a connection between the free end of the length of metal and the movable element of the switch for operating said switch when the container is heated.

7. A pressure cooker vessel for processing food at elevated temperatures and pressures or at elevated temperatures comprising a container of heat conducting metal, a pressure-tight lid for said container, an electrical heating unit mounted adjacent the bottom of said container for heating the same, means including an electric switch having an adjustable element, a movable element for energizing and de-energizing said heating element, a thermostatic means for operating said switch, including a length of metal having a very small coefficient of expansion with heat, mounted substantially parallel with a segment of said container wall remote from said heating unit, said length of metal being attached at one end to said container and having the remainder of its length free to move with reference to the vessel, and a connection between the free end of the length of metal and the movable element of the switch for operating said switch when the container is heated from a position within the range of movement of said movable element to a position outside of the range of movement of said movable element.

8. A pressure cooker vessel for processing food at elevated temperatures and pressures or at elevated temperatures comprising a container of heat conducting metal, a pressure-tight lid for said container, an electrical heating unit mounted on the outside of said container adjacent the base thereof for heating the same, means including an electric switch having an adjustable element, a movable element for energizing and de-energizing said heating element, a thermostatic means for operating said switch, including a length of metal having a very small coefficient of expansion with heat, mounted substantially vertically in the wall of said container, said length of metal being attached at one end to said container and having the remainder of its length free to move with reference to the vessel, a connection between the free end of the length of metal and the movable element of the switch for operating said switch when the container is heated, and manually movable means for varying the position of the adjustable element throughout a range corresponding to the pressure-temperature range of the container and elevated temperature range thereof.

9. A pressure cooker food processing vessel comprising a container of metal having a good heat conductivity and relatively large coefficient of expansion with heat, a heating element for said vessel mounted adjacent one portion thereof, control means for said heating element mounted on said container, said means comprising a rod of material having a relatively small coefficient of expansion with heat imbedded throughout its length in a wall of container remote from said heating unit, said rod being attached to said container wall at one end and freely movable thereto throughout the remainder of its length, said control means being located with respect to said rod to be actuated thereby when the rod moves relative to the container due to change in temperature thereof.

10. A pressure cooker food processing vessel comprising a container of metal having a good heat conductivity and relatively large co-efficient of expansion with heat, a heating element for said vessel mounted adjacent one portion thereof, control means for said heating element mounted on said container, said means comprising a rod of material having a relatively small coefficient of expansion with heat imbedded throughout its length in said container wall, said rod being attached to said container wall at one end and freely movable thereto throughout the remainder of its length, and a motion multiplier connecting said rod and control means.

MAURICE H. GRAHAM.